United States Patent Office 2,899,424
Patented Aug. 11, 1959

2,899,424
PHYSIOLOGICALLY ACTIVE HYDRAZINIUM SALTS

Bernard Rudner, Baltimore, Md., assignor to W. R. Grace & Co., New York, N.Y., a corporation of Connecticut No Drawing. Application February 18, 1957
Serial No. 640,584

11 Claims. (Cl. 260—239.1)

This invention relates to novel quaternized nitrogen salts. In one specific aspect, it relates to quaternized derivatives of substituted hydrazines which are physiologically active. In still another aspect, it relates to physiologically active hydrazinium compounds.

For many years it has been known that certain organic salts possess remarkable physiological activity. For example, Novocaine (diethylaminoethyl 4-aminobenzoate) has been used as a local anesthetic. A 0.25 to 2% solution has been found to be a suitable administration for infiltration, nerve-block, and spinal anesthesia. Novocaine, like many physiologically active compounds, is highly toxic. Doses of 0.01 to 0.13 gram have caused death in sensitive individuals. I have discovered that the quaternized hydrazinium salt derivatives of Novocaine and similar compounds which are, on one hand, equal or superior to the parent compound with respect to physiological activity, and, on the other hand, generally somewhat less toxic than the parent compound.

It is, therefore, an object of the present invention to provide a new generic class of hydrazinium salts, useful for pharmaceutical and other purposes, which can be made in commercial quantities.

In accordance with the present invention, I have discovered a novel and useful generic class of hydrazinium salts corresponding to the general formula:

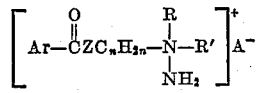

In the above formula Ar is a benzene, naphthalene, pyridine or quinoline nucleus. The Ar nucleus may be unsubstituted or substituted by hydroxyl, ether, or amino groups. Z is oxygen or NH. R and R' are lower alkyl radicals, hydroxy lower alkyl radicals or carbon containing residues, which when taken collectively with each other represent the necessary atoms to complete an annular structure having 5 to 6 endocyclic atoms. For example, if R is $CH_2CH_2O$ and R' is $CH_2CH_2$, collectively they complete the morpholine structure. "$n$" ranges in value from 2 to 6; $A^-$ is a non-toxic anion.

Since the primary use of my novel compounds is in pharmaceutical work, it is necessary that $A^-$ be a non-toxic anion since obviously non-toxicity is of paramount importance in such work. The salts obtained through the variation of $A^-$ in some cases have special advantage due to solubility, ease of compounding, lack of objectionable taste and the like, but these considerations are all subsidiary to the characteristic of the cation which are independent of the character of $A^-$. Hence, all variations of $A^-$ are considered equivalent for the purposes of the present invention. Specific but non-limiting examples of the anion $A^-$ are as follows: chloride, bromide, iodide, phosphate, pyrophosphate, sulfate, bisulfate, carbonate, acetate, benzoate, salicylate, citrate, propionate, 2-ethylhexanoate, laurate, oleate, stearate, glycerophosphate, glycolate, diglycolate, lactate, malate, tartarate, succinate, mandelate, tropate, gluconate, saccharate, glutaconate, glutamate, acetoxybenzoate, gallate, aspartate, methanesulfonate, abietate, ascorbate, nicotinate, cholate and the like. Certain anions derived from commercially available cation exchange resins are also useful for the purpose of the present invention. Synergistic effect also obtains using such anions as the anti-microbials; viz: Penicillin G, aureomycin, terramycin, tetracycline, amphomycin, sulfanilamide, sulfasuxadine, sulfacetimide, sulfapyridine and other sulfa drugs. Pharmaceutical anions such as the barbital, phenobarbital, seconal, folic acid, cinchophen, 8-hydroxyquinoline ions and the like are similarly useful.

My novel compounds may be readily prepared by the various reaction sequences shown below in Equations 1 to 5. In all the equations that follow throughout the specification, the substituents are those designated in the definition, supra. Special designations are noted.

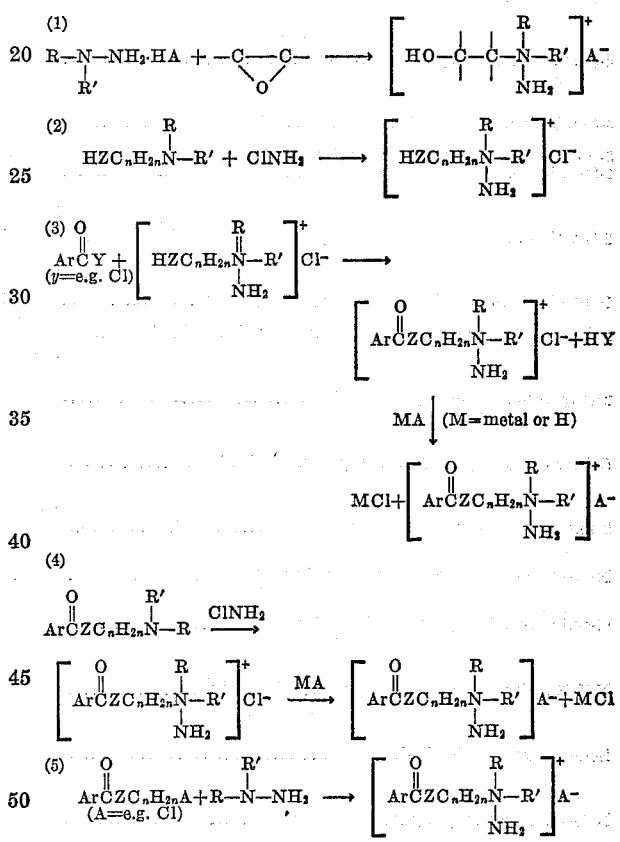

Equations 1 and 2 show convenient methods of preparing intermediates of my novel compounds. Using the technique of Equation 3 these useful intermediates become the pharmacologically active compounds of the present invention. Equations 4 and 5 show two distinct and direct methods of preparing my novel salts. The method of Equation 4, that of reacting chloramine in the tertiary amine, was recently discovered to be an effective method of making hydrazinium chlorides. Tertiary amines are readily available bases. Chloramine is an excellent reagent since it can be economically obtained in commercial quantities by using the well known process of Harry H. Sisler et al., described in U.S. Patent No. 2,710,248, where chlorine and ammonia are reacted in the vapor phase to produce chloramine (monochloramine). By treating an appropriate tertiary amine with chloramine, compounds of my novel generic class may be prepared. Table 1 shown hereunder gives a suggested but non-limiting illustration of suitable amines.

TABLE 1

| Compound | Formula |
|---|---|
| benzoyloxyethyldimethylamine | $C_6H_5-CO_2C_2H_4-N-(CH_3)_2$ |
| anisoylaminoethyldiethylamine | $CH_3OC_6H_4CONH-C_2H_4-N-(C_2H_5)_2$ |
| (2-benzoyloxy-2-methyl)butyldimethylamine | $C_6H_5CO_2C(C_2H_5)(CH_3)-CH_2-N-(CH_3)_2$ |
| (4-ethoxybenzoyloxy)ethyldiethylamine | $p-C_2H_5OC_6H_4CO_2C_2H_4-N-(C_2H_5)_2$ |
| 1-(3-benzoyloxypropyl-1-)2-methylpiperidine | $C_6H_5CO_2C_3H_6-N(C_5H_9)(CH_3)$ (2-methylpiperidine) |
| 1-(p-cyclohexyloxybenzoyloxy)propyl-2-methylpiperidine | $p-C_6H_{11}OC_6H_4CO_2C_3H_6-N(C_5H_9)(CH_3)$ |
| 4-(p-aminobenzoyloxy)ethylmorpholine | $p-H_2NC_6H_4CO_2C_2H_4-N(morpholine)$ |
| 4-(p-n-butylaminobenzoyloxy)ethyldimethylamine | $p-n-C_4H_9NHC_6H_4CO_2C_2H_4N(CH_3)_2$ |
| 3-(p-aminobenzoyloxy)propyl-di-n-butylamine | $p-H_2NC_6H_4CO_2CH_2CH_2CH_2N(C_4H_9)_2$ |
| 2-(3-amino-4-n-propoxybenzoyloxy)ethyldiethylamine | $4-n-C_3H_7O-3-H_2NC_6H_3CO_2C_2H_4N(C_2H_5)_2$ |
| 2-(4-amino-2-hydroxybenzoylamino)propyldiethanolamine | $4-H_2N-2-HOC_6H_3CONH-CH(CH_3)CH_2N(C_2H_4OH)_2$ |
| 2-(4-amino-3-n-butoxybenzoyloxy)ethyldiethylamine | $4-H_2N-3-n-C_4H_9OC_6H_3CO_2C_2H_4N(C_2H_5)_2$ |
| 2-(benzoyloxy)-2-dimethylaminomethylbutyldimethylamine | $C_6H_5CO_2C(C_2H_5)-(CH_2N(CH_3)_2)_2$ |
| methyl-bis-(2-benzoyloxyethyl)amine | $(C_6H_5CO_2C_2H_4)_2-N-CH_3$ |
| (2-benzoyloxypropyl)-(2-hydroxypropyl)ethylamine | $C_6H_5CO_2CH(CH_3)CH_2N(C_2H_5)CH_2CH(CH_3)OH$ |
| 2-anisoyloxy-3-(dimethylamino)butane | $p-CH_3OC_6H_5CO_2CH(CH_3)CH(CH_3)N(CH_3)_2$ |
| N-(4-amino-3-chlorobenzoyloxy)propylpyrrolidine | $4-H_2N-3-Cl-C_6H_3CO_2CH_2CH_2CH_2N(pyrrolidine)$ |
| (4-amino-1-naphthoyloxy)ethyldimethylamine | $4-H_2NC_{10}H_6-1-CO_2C_2H_4N(CH_3)_2$ |
| N-[2-(3-hydroxy-2-naphthoylamino)propyl]morpholine | $3-HOC_{10}H_6-2-CONHCH(CH_3)CH_2N(morpholine)$ |
| iso-nicotinoyloxyethyldiethylamine | pyridine-COOC$_2$H$_4$N(C$_2$H$_5$)$_2$ |
| N-(6-aminonicotinoyloxy)ethylpiperidine | $H_2N$-pyridine-$COOC_2H_4N(piperidine)$ |
| (2-n-butoxycinchoninoylamino)ethyldiethylamine | quinoline-3-CO-NH-C$_2$H$_4$N(C$_2$H$_5$)$_2$, 2-OC$_4$H$_9$(n) |
| 5-(2-phenylcinchoninoyloxy)amyldiethylamine | 2-phenylquinoline-4-CO-O-CH$_2$CH$_2$CH$_2$CH$_2$CH$_2$N(C$_2$H$_5$)$_2$ |
| p-aminobenzoyloxyethylmethylisobutylamine | $p-H_2NC_6H_4CO_2C_2H_4N(CH_3)CH_2CH(CH_3)_2$ |
| 3-(p-aminobenzoylamino)-2,2-dimethylpropyldimethylamine | $p-H_2NC_6H_4CONHCH_2C(CH_3)_2CH_2N(CH_3)_2$ |
| 1-(p-aminobenzoyloxyl)-2-morpholino-4-methylpentane | $H_2NC_6H_4CO_2CH_2CH(N-morpholino)CH_2CH(CH_3)_2$ |

The combined method shown in Equations 1 and 3 has desirable possibilities. The Equation 1 shows a most useful method of preparing branch chain intermediates, illustrated in Equation 6 below.

(6)
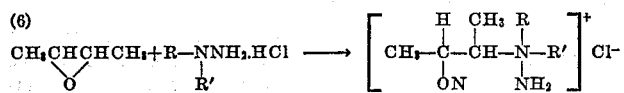

The product of Equation 6 may be reacted as shown above in Equation 3 to produce one of the novel compounds of the present invention. Epoxy compounds are cheap and plentiful. They are especially suitable for preparing branch chain intermediates (of which the product of Equation 6 is typical), since no tertiary amine of this general structure is readily available in commercial quantities. The combined method of Equations 1 and 3 is of course, somewhat limited in that its use as an intermediate extends only to the compounds where Z=oxygen. Compounds prepared by the intermediate forming reactions of Equations 1 and 2 are shown below in Table 2. In the table the hydrazinium compound is listed along with its structural formula and indication in parenthesis of the general preparative method.

TABLE 2

| Compound | Formula | Method |
|---|---|---|
| dimethylhydroxyethyl | $(HOC_2H_4N(CH_3)_2NH_2)^+Cl^-$ | (made by 1 or 2). |
| methyl-bis-hydroxyethyl | $[(HOC_2H_4)_2NCH_3NH_2]^+Cl^-$ | (1), (2). |
| di-isopropylhydroxyethyl | $[(CH_3CH)_2N(CH_3)(NH_2)-C_2H_4OH]^+Cl^-$ | (2). |
| methylethylhydroxyethyl | $[HOC_2H_4NNH_2(CH_3)(C_2H_5)]^+Cl^-$ | (1), (2). |
| dimethyl-2-hydroxypropyl | $[(CH_3)_2NCH_2CHOH(NH_2)(CH_3)]^+Cl^-$ | (1), (2). |
| diethyl-2,3-dihydroxypropyl | $[(C_2H_5)_2N-CH_2CHOHCH_2OH(NH_2)]^+Cl^-$ | (1), (2). |
| 4-amino-4-(3-aminopropyl)morpholinium chloride. | $[H_2NC_3H_6-N(H_2N)(morpholine\ O)]^+Cl^-$ | (2). |
| 1-amino-1-(2-hydroxyethyl)piperidinium chloride. | $[HOC_2H_4-N(NH_2)(piperidine)]^+Cl^-$ | (1), (2). |
| (d)-1-amino-1-(3-hydroxybutyl-2-)pyrrolidinium chloride. | $[CH_3CHOH-CH(CH_3)-N(H_2N)(pyrrolidine)]^+Cl^-$ | (1). |
| 2-methyl-1-amino-1-(3-aminopropyl)piperidinium chloride. | $[H_2NC_3H_6N(NH_2)(2-methylpiperidine)]^+Cl^-$ | (2). |
| 1,1-dibutyl-1-(3-hydroxypropyl)hydrazinium chloride. | $[HOC_3H_6-N(C_4H_9)_2-NH_2]^+Cl^-$ | (2). |
| 1,1-dimethyl-1-(ω-aminohexyl)hydrazinium chloride. | $[HO(CH_2)_6N(CH_3)_2-NH_2]^+Cl^-$ | (2). |

Alkylating agents suitable for use in the reaction of Equation 5 are shown below in Table 3.

TABLE 3

| Compound | Formula |
|---|---|
| 2-benzoyloxyethyl chloride | $C_6H_5CO_2C_2H_4Cl$ |
| 3-(veratroyloxy)butyl-2-chloride | $3,4-(CH_3O)_2C_6H_3CO_2CH(CH_3)CH(CH_3)Cl$ |
| bis-(2-benzoyloxy)ethyl sulfate | $(C_6H_5CO_2C_2H_4O)_2SO_2$ |
| 3-(3-ethoxybenzoylamino)propylbromide | $3-C_2H_5OC_6H_4CONHCH_2CH_2CH_2Br$ |
| bis-(piperonylaminoethyl) acidphosphate | $(O-CH_2-O-C_6H_3-CONHCH_2CH_2O)_2POH$ |

In preparing compounds of the present invention by the method of Equations 2 and 4, it is usually suitable to contact chloramine with a solution of the basic tertiary amine, allow the reaction to proceed until the desired quantity of chloramine is consumed, and then isolate and purify the resultant hydrazinium chloride by standard laboratory techniques. While chloramine can be advantageously prepared in a form of a gaseous chloramine-ammonia nitrogen stream obtained from a generator constructed according to the teachings of Sisler et al., other methods are equally adaptable for the purposes of the present invention. An effective procedure is that of Coleman et al., fully described in Inorganic Syntheses, volume 1, 59 (1939). Alternatively, the hydrazinium chlorides can be formed directly as described in my co-pending application Serial No. 605,230, filed August 20, 1956, which teaches the reaction of chlorine and a tertiary amine in the presence of ammonia. For simplicity, when both the base and product are soluble in the same inert solvent, e.g., aromatics, I have formed chloramine in situ by this method in solution containing tertiary amine.

The choice of solvent is one of economy and simplicity. For good absorption (and therefore reaction) it is desirable to bubble chloramine through a long column of a solution comprising the amine dissolved in a relatively cheap inert solvent. Solvents which serve this purpose include hydrocarbons, e.g. heptane, cyclohexane, benzene, xylene and the like; ethers, e.g. diethyl ether, diamyl ether, dioxane and anisole; amides, e.g. dimethylformamide and dimethylacetamide; halohydrocarbons, e.g. chloroform, carbon tetrachloride, trichloroethylene, and chlorobenzene; and nitroaromatics, e.g. nitrobenzene. For special purposes, water and other hydroxylic solvents such as ethanol and Cellosolve may be used. Equations 3 and 4 indicate that after formation of the hydrazinimum chloride, a further metathesis is necessary to prepare salts of other anions. Certain useful anions contemplated by the present invention have been set forth specifically in connection with the general formula. Equations 3 and 4 indicate that the desired change of anion can be effected readily by mixing aqueous solutions of the hydrazinimum chloride and the appropriate reagent; e.g. to prepare the hydrazinimum iodide from the hydrazinium chloride, aqueous solutions of the hydrazinimum chloride and potassium iodide can be admixed. More often than not, the product hydrazinimum iodide precipitates directly as the reaction progresses. Certain other salts, e.g. penicillinates are more water soluble than the chloride and are therefore not formed under such conditions. Many organic salts, e.g. the benzoates, mandelates, and citrates, are best made in aqueous alcohol solution. The salts of acidic antibiotic polypeptides, such as amphomycin can be readily prepared by mixing alcoholic solutions containing equivalent quantities of an alkali metal salt of the polypeptide and hydrazinimum chloride, filtering off the alkali metal chloride which precipitates in quantitative yields, and evaporating the solution to dryness to obtain the desired hydrazinium salt.

The reactant ratios used in the above processes are not critical. When chloramine is used as a reactant (using the methods of Equations 2 and 4), it is necessary to have present about 5 mols of ammonia per mole of chloramine to stabilize it. The ratio of chloramine to tertiary amine is predicated on practical and not theoretical considerations. For instance, if chloramine is relatively cheap compared to the tertiary amine to be reacted therewith, chloramine would be used in stoichiometric quantities or even excess to push the reaction to completion. Obviously, one could waste chloramine by adding it without purpose to the converted amine so there is no controlling theoretical amount of chloramine which must be added to the reaction. The reaction temperatures used to prepare my novel compounds are governed by practical rather than theoretical limits. Economically, these limits are between the boiling point of ammonia (−33° C.) and water (100° C.). As a matter of convenience, I prefer to use ambient temperature, even though it has been generally established that the yield of a product usually increases with decreasing temperature in the range of −20 to plus 80° C.

Likewise, pressure control is a matter of convenience rather than necessity. Preferable pressure of conditions are those at or slightly above atmospheric although the allowable maximum extends upwardly therefrom and is controlled to a large extent by the type of equipment used. A slight vacuum could be used in some instances.

The time required to complete the chloramine-tertiary amine reaction or the metathesis reactions to produce my novel compounds from the appropriate intermediate is dependent on the forementioned factors, thoroughness of contact, and intrinsic process variations apparent to one skilled in the art. Very often all of the reactions shown in Equations 1 to 5 have an induction period of from 5 to 30 minutes. Occasionally it is convenient to let the reaction mixture stand from 1 to 24 hours to obtain a greater yield of product.

The product work-up as well as the variable methods for producing compounds of the present invention are further illustrated by the following examples.

*Example I*

A generator was constructed to prepare gaseous mixtures of chloramine, ammonia and nitrogen using the process of Sisler et al., supra. Such a gaseous chloramine mixture was passed into excess N,N-dimethylaminoethanol at 25° C. No solid formed during the reaction, but on chilling the reaction mixture the hydrazinium chloride precipitated as a crystalline mass. The material was recrystallized from an ethanol-ethyl acetate mixture. It was subsequently identified as 1,1,1-(2-hydroxyethyl)-dimethylhydrazinium chloride, melting point 160–163° C.

*Example II*

A solution of 6.7 grams of 1,1-dimethylhydrazine (0.1 mole of 90% pure base) in 500 ml. dry peroxide-free diethyl ether was saturated for one-half hour at −10° C. with dry HCl. It was sealed and refrigerated for forty-eight hours. The semi-solid residue obtained therefrom by decantation was washed by decantation with absolute peroxide-free diethyl ether and vacuum dried to give a 98% yield of dimethylhydrazine hydrochloride. This material was refluxed in 100 ml. of isopropyl alcohol and then treated with a slow stream containing a 1:3 molar mixture of ethylene oxide and nitrogen. A total of 4.8 grams of $C_2H_4O$ (0.11 mole) was added over a period of 30 minutes. The mixture was refluxed for 30 minutes and allowed to cool to room temperature. It was refrigerated overnight and a solid mixture of product and unreacted hydrochloride was obtained therefrom by filtration. The salt and the filtrate were poured into 200 ml. of 5% sodium bicarbonate solution, and evacuated dry in vacuum at 40 to 50° C. The residue was extracted with isopropyl alcohol. Crude

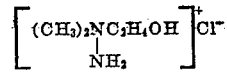

was obtained on adding ether. The product was recrystallized from ethyl acetate to give the highly hygroscopic pure hydrazinium chloride in good yield. The preparative reactions are shown in Equation 7.

(7) $(CH_3)_2NNH_2 + HCl \longrightarrow (CH_3)_2NNH_2 \cdot HCl \xrightarrow{C_2H_4O}$

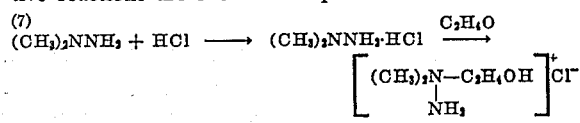

*Example III*

A well stirred mixture of 1.4 grams (0.1 mole) of $$HOC_2H_4\overset{\overset{NH_2}{|}}{N}-(CH_3)_2Cl^-$$

in 150 ml. of pyridine at 10–15° C. was treated dropwise over a period of 20 minutes with an equal quantity of distilled benzoyl chloride in 10 ml. of benzene. The mixture was allowed to come to room temperature with continuous agitation and was held for 3 hours. It was evaporated to dryness under vacuum at 20–30° C. The dried material was slurried in 100 ml. of 5% $K_2CO_3$ solution and extracted twice with an equal volume of benzene, and twice with equal volumes of chloroform. Evaporation of the chloroform extract gave a poor yield of relatively pure 1,1-dimethyl-1-benzoylethylhydrazinium chloride as a hygroscopic semi-solid. The yield was increased appreciably by vacuum evaporation of the $K_2CO_3$ solution to dryness, followed by an extraction with isopropyl alcohol. Recrystallization of the combined fraction from ethyl acetate gave a pure product, hygroscopic plates melting at 143–144° C. This material was very soluble in water and soluble in ethyl acetate and isopropyl alcohol. It was recrystallizable from chloroform and ethyl acetate, and insoluble in benzene, carbon tetrachloride, hexane and diethyl ether. From its aqueous solutions it gave a hexafluorophosphate melting at 172–173° C. (d.) and a picrate melting at 101–102° C. when such solutions were treated with appropriate reagents. The preparative reaction for this novel compound is shown hereunder in Equation 8.

(8)

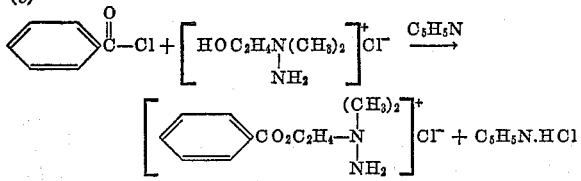

*Example IV*

A solution of 0.44 gram (0.1 mole) ethylene oxide in 20 ml. pure chloroform at 0–3° C. was treated dropwise (with constant stirring) with 1.5 grams benzoyl chloride in 10 ml. chloroform over a period of 20 minutes. The reaction mixture was stirred for 2 hours at 5–10° C. and allowed to sit at room temperature over night. 0.9 gram of dimethylhydrazine was added thereto along with a drop of dispersing agent (Emulphor ON). The mixture was stirred at room temperature for 2 hours, and then refluxed for 2 hours and chilled over night. Filtration gave a fair yield of crude dimethylbenzoyloxyethylhydrazinium chloride. This product was recrystallized from ethyl acetate to give white crystals melting at 140–142° C. The preparative reaction is shown below in Equation 9.

(9)

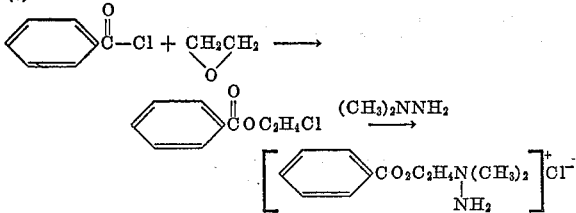

*Example V*

50 grams of procaine hydrochloride(diethylaminoethyl-4-aminobenzoate hydrochloride) dissolved in 350 ml. of water was layered over with 200 ml. of chloroform and then treated with a three-fold excess of sodium bicarbonate to form the free amine according to the preparative reaction shown below in Equation 10.

(10)

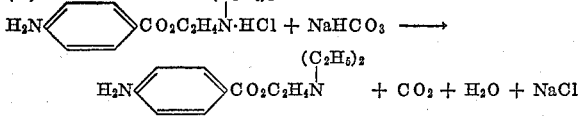

The combined chloroform extract and 50 ml. of wash, dried for one-half hour over anhydrous $MgSO_4$, was made up to one liter with chloroform, and then subjected to 0.75 equivalent of chloramine from the generator. The reaction was completed within 30 minutes after gasification stopped. A precipitate weighing 25.6 grams containing 63.7% pure, 1,1-diethyl-1-[2-(4-aminobenzoyloxy)ethyl] hydrazinium chloride was obtained therefrom. By ethanol extraction, a product was obtained which melted between 208–210° C. Additional product was obtained from the chloroform filtrate. Recrystallization first from chloroform, then from acetonitrile gave lemon-yellow crystals, melting point 217° C. An aqueous solution of the product was treated with aqueous potassium hexafluorophosphate to form the corresponding hydrazinium salt melting at 152° C. The hydrazinium chloride also formed a yellow picrate in aqueous solution which after separation and work-up was found to melt at 113° C.

*Example VI*

The chloramine-ammonia gas stream was passed into an excess of liquid N,N-diethylaminoethanol. As the reaction proceeded, a paste like mass formed which was separated from the unreacted amine by decantation. This paste like product was mixed with ethyl ether, which resulted in crystallization of a solid and evolution of ammonia. Because of the hygroscopic nature of the product, 1-(2-hydroxyethyl)-1,1-diethylhydrazinium chloride, it was converted to the picrate (melting point 179.5–180.5° C.) for identification. Approximately a 99% yield of product was obtained based on the amount of chloramine used.

*Example VII*

Product of Example VI was treated with benzoyl chloride substantially repeating the procedure of Example III. Using similar work-up procedures, there was obtained as hygroscopic plates, 1,1-diethyl-1-benzoyloxyethylhydrazinium chloride, which melted with decomposition beginning at approximately 176° C. Its yellowish iodide decomposed at about 201° C. The preparative reaction is shown hereunder in Equation 11.

(11)

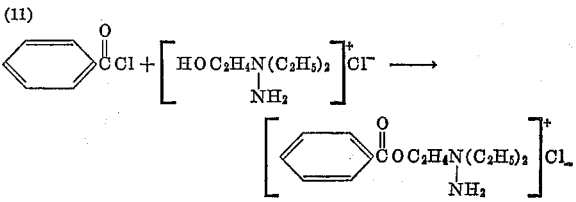

*Example VIII*

10% aqueous solutions (each containing 0.1 mole) of 1,1-diethyl-1-[2-(4-aminobenzoyloxy)ethyl]hydrazinium chloride (the product of Example V), and potassium Penicillin G, U.S.P. (0.16 BOV/100 g.) were evaporated in a nitrogen stream at 20–25° C. The material thus obtained was extracted with isopropyl alcohol to give an off-white gum. The gum was vacuum dried to a friable hygroscopic white powder, melting point 201–206° C. The preparative reaction of this novel salt is shown hereunder in Equation 12.

(12)

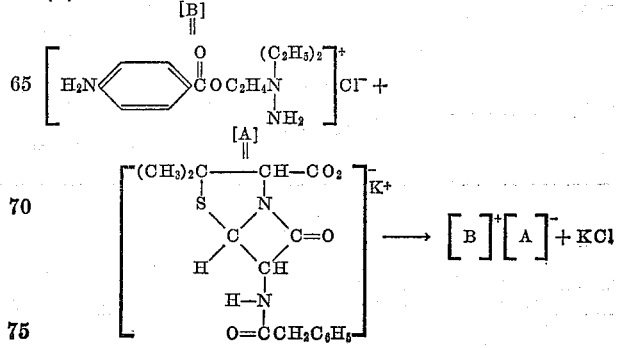

A purer product was made by mixing equivalent quantities of the two reactants as 10% solutions in isopropyl alcohol, warming briefly, allowing to cool, filtering off KCl, and evaporating the filtrate nearly to dryness to get white needles of the 1,1-diethyl-1-(p-aminobenzoyloxy)ethyl hydrazinium salt of benzylpenicillin, melting point 245-248° (d.).

*Example IX*

The procedure of Example VIII was substantially repeated using sodium barbiturate in lieu of the potassium Penicillin G. On work-up, the novel 1,1-diethyl-1-[2-(4-aminobenzoyloxy)ethyl]hydrazinium barbiturate was obtained. This product melted with decomposition at about 210° C. The preparative reaction is shown below:

(13) (See Example VIII)

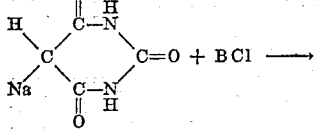
$C=O + BCl \longrightarrow$

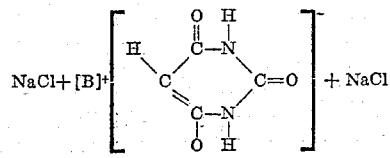

*Example X*

Saturated (or, where more convenient, 5% weight/volume) aqueous solutions of product of Example VII were mixed with the following sodium salts: tannate, sulfapyridine, cinchomeronate, iodide, sulfathiazole and salicylate. The products obtained from these reactions are described below in Table 4.

was exothermic, use of a cold water bath was required to maintain the temperature at approximately 30° C. The filtered, washed and dried solid, weighing 14.6 grams, consisted of glistening off-white plates melting at 149-152° C. It was by chloride titration, 96% pure 4-amino-4-(2-hydroxy-ethyl)morpholinium chloride. The amount of product obtained represented approximately 60% of the theoretical yield. Two recrystallizations from absolute alcohol gave transparent gleaming plates melting at 154-155° C. The pure product was very water soluble, recrystallizable from absolute alcohol, and decreasingly soluble in less polar solvents.

*Example XII*

A quantity of N-aminomorpholine was prepared by the procedure of Knorr and Brownsdon Ber. 35, 4477 (1902). The anhydrous hydrochloride of this material was prepared and treated in a manner similar to that of Example II. An 0.01 mole portion of the hydrochloride in 30 ml. of isopropyl alcohol was reacted at 0 to 10° C. with 0.01 mole ethylene oxide as a gaseous mixture. The resulting mixture was stirred continuously for 2 hours and then allowed to warm to room temperature. It was thereafter refluxed for 30 minutes and the solvent was stripped off in vacuo. Using the work-up procedure described in Example II, a good yield of the product identical to that of Example XI was obtained. The novel product of this experiment had a melting point of 152-153° C.

*Example XIII*

A Schotten-Baumann reaction of the product of Example XII with 1.6 equivalents of benzoyl chloride and 3.8 equivalents of NaOH in a 20% aqueous solution, gave after extraction with chloroform and evaporation to dryness a 26% yield of 4-amino-4-(benzoyloxyethyl)morpholinium chloride. This crude brown gum was recrystallized from ethyl acetate to give off-white plates which melted at 108-110° C. The preparative reaction is shown below in Equation 14.

TABLE 4

| Reactant | Formula of Product | Characteristics of Product |
|---|---|---|
| Tannate | $\left[\text{C}_6\text{H}_5\text{-}CO_2C_2H_4\text{-}\overset{(C_2H_5)_2}{\underset{NH_2}{N}}\right]^+ [C_{14}H_9O_9]^-$ | Darkens rapidly in solution. Decomposition above 200° C. |
| Sulfapyridine | $\left[\text{C}_6\text{H}_5\text{-}CO_2C_2H_4\overset{(C_2H_5)_2}{\underset{NH_2}{N}}\right]^+ \left[H_2N\text{-}C_6H_4\text{-}\underset{O}{\overset{O}{S}}\text{-}N\text{-}C_5H_4N\right]^-$ | Water soluble, difficult to purify. |
| Cinchomeronate | $\left[\text{C}_6\text{H}_5\text{-}CO_2C_2H_4\overset{(C_2H_5)_2}{\underset{NH_2}{N}}\right]^+ \left[\text{quinoline-CO}\right]_{C_6H_5}$ | Recrystallizable from water. Decomposed about 150°. |
| Iodide | $\left[\text{C}_6\text{H}_5\text{-}CO_2C_2H_4N\text{-}(C_2H_5)_2\underset{NH_2}{|}\right]^+ I^-$ | Water insoluble, yellow, melting about 210° C. (d.). |
| Sulfathiazole | $\left[\text{C}_6\text{H}_5\text{-}CO_2C_2H_4\overset{(C_2H_5)_2}{\underset{NH_2}{N}}\right]^+ \left[H_2N\text{-}C_6H_4\text{-}\underset{O}{\overset{O}{S}}N\text{-}C\overset{N\text{-}CH}{\underset{S\text{-}CH}{\|}}\right]^-$ | Water recrystallizable, melting about 154° C. |
| Salicylate | $\left[\text{C}_6\text{H}_5\text{-}CO_2C_2H_4\overset{(C_2H_5)_2}{\underset{NH_2}{N}}\right]^+ \left[\text{C}_6H_4\overset{OH}{\underset{C\text{-}O}{|}}\right]^-$ | Water soluble, melting about 163° C. |

*Example XI*

A chloramine-ammonia gas stream from the generator was introduced into 20 ml. of β-hydroxyethylmorpholine in 50 ml. of xylene for 47 minutes. Because this reaction (14)

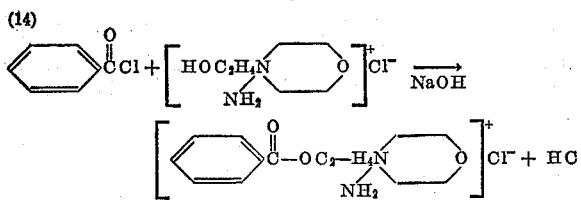

*Example XIV*

A 25 ml. portion (19.9 g.) of dimethylaminopropylamine in 50 ml. of xylene was reacted at room temperature with a chloramine-ammonia nitrogen gas stream for 80 minutes (1.3 equivalents of chloramine per equivalent of amine). The temperature rose rapidly to 41° C. and remained there even with the use of a cold water bath. The mixture thickened as the reaction progressed and 50 ml. additional xylene was added by the time the reaction was half over. The reaction mixture was allowed to stand for one hour after gasification and then quickly suction filtered in a nitrogen atmosphere. The white solid thus obtained, after being washed with xylene and hexane and vacuum dried, gave 20.2 grams of relatively pure 1,1 - dimethyl - 1 - (3 - aminopropyl)hydrazinium chloride. This novel product was converted to a very thick tan liquid on standing and could not be solidified by vacuum drying. Precipitation of this material from filtered isopropyl alcohol solution by ether and then vacuum drying, gave a 96% pure product.

*Example XV*

A Schotten-Baumann reaction of the product of Example XIV by procedure similar to that described in Example XIII, gave 1,1-dimethyl-1-(3-benzoyl-amino)propyl hydrazinium chloride. The crude product was recrystallized from chloroform-carbon tetrachloride mixtures to give white crystals which melted between 158–161° C. (d.). The novel product was soluble in water and chloroform and somewhat less so in ethanol. It was recrystallizable from butyl alcohol. When treated with an appropriate reagent, it gave a dull yellow picrate melting between 146–148% C.

*Example XVI*

A 10 gram quantity of p-aminobenzoylaminoethyldiethylamine hydrochloride in 50 ml. water was added to 50 ml. of chloroform. To this mix was added in five 2 g. portions (10 g. total) of sodium carbonate. The re-resulting mixture was stirred well to extract the free amide from the chloroform. The alkaline solution was re-extracted with three 50 ml. portions of chloroform. The combined organic extract was dried over anhydrous magnesium sulfate for 2 hours and then reacted with 1.3 equivalents of chloramine to give a product hydrazinium chloride which represented 81% conversion, based on the amount of amine. This material was recrystallized from ethyl acetate to give, as white plates, the novel 1,1-diethyl-1-(4-aminobenzoylamino)ethyl hydrazinium chloride:

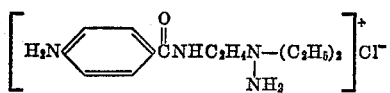

*Example XVII*

Following a procedure similar to that of Example XVI, 29.9 grams of p-n-butylaminobenzoyloxyethyldiethylamine hydrochloride was converted to the free base in the presence of chloroform and reacted with a chloramine stream from the generator for one hour. A 30.5 gram mixture containing 79 parts of white, crude 1,1-diethyl - 1 - (p-n-butylaminobenzoyloxy)ethylhydrazinium chloride and 21 parts of NH$_4$Cl was obtained therefrom. A Soxhlet extraction with chloroform gave pure product; glistening plates melting at 195° C. When treated with appropriate reagents, this novel compound formed a yellow picrate decomposing at about 80° C. It did not form a hexafluorophosphate salt.

*Example XVIII*

On reacting potassium penicillin G and 1,1-diethyl-1-(p-n-butylaminobenzoyloxy)ethylhydrazinium chloride according to the second procedure of Example VIII, there was obtained an excellent yield of 1,1-diethyl-1-(p-n-butylaminobenzoyloxy)ethylhydrazinium salt of penicillin G. It consisted of white needles melting at 145–155° (melting point 158–159° after one recrystallization), was very soluble in isopropyl alcohol and was appreciably less water soluble than the salt of Example VIII. The product is assigned the structural formula:

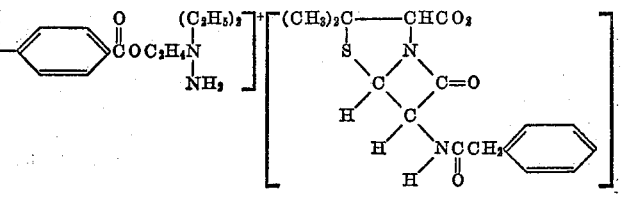

*Example XIX*

A 30 gram portion of 2-benzoyloxy-2-methylbutyl-1-dimethylamine hydrochloride was converted as before to the free base, extracted with chloroform and reacted with chloramine gas stream for one hour to give a precipitate of pure ammonium chloride. Evaporation of the filtrate gave relatively pure 1,1-dimethyl-1-(2-benzoyloxy-2-methyl)butylhydrazinium chloride. This new product was obtained as a very thick yellow oil which resisted attempts to make it crystalline. It was washed free of unreacted base and impurities with diethylether and vacuum-dried to give a white semi-solid, 96% pure by analysis. It decomposed after running clear at about 140° C.

*Example XX*

A 5 gram portion of 2-benzoyloxy-2-dimethylaminomethyl-1-dimethyl amino-butane nitrate was converted to the free base as above and then to the chloramine adduct. The crude product obtained thereby appeared to be a mixture of mono and dichloramine adducts in about a 9:1 ratio:

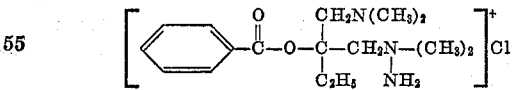

and

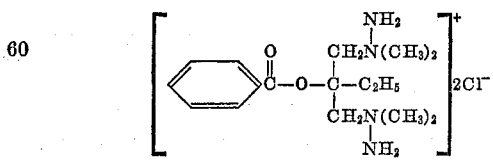

The mixture, which could not be resolved by fractional crystallization, melted with decomposition above 200° C. It was quite hygroscopic.

*Example XXI*

A 5 gram portion of 3-(p-aminobenzoyloxy)-1-n-dibutylaminopropane sulfate was converted to the free base and then to the chloramine adduct by the procedure described aforesaid. From the filtrate was obtained a very viscous light yellow oil representing the novel 1,1-di-n-butyl - 1 - [3 - (p - aminobenzoyl)-oxypropyl]hydrazinium chloride. This product was separated from the unreacted amine by dissolving it in a minimum of water, adding aqueous 5% sodium carbonate in excess, and extracting with benzene. The benzene extract, evaporated to dryness with excess hydrochloric acid, gave the hydrated hydrochloride of starting amine. The sodium carbonate solution, saturated cold with sodium carbonate and extracted with chloroform gave, on evaporation of the solvent, much purer hydrazinium chloride. Evaporation of a hydrochloric acid solution gave a hygroscopic hydrochloride which evolved gas at about 120° C. An aqueous solution of this material was saturated with sodium carbonate and then extracted with chloroform and evaporated to dryness to give a good yield of the relatively pure hydrazinium salt.

*Example XXII*

A 0.2 mole portion of anisoyl chloride in 50 ml. of anhydrous carbon tetrachloride was stirred at —10° C. and treated dropwise with 0.4 mole of 4-(3-aminopropyl)morpholine in 150 ml. of carbon tetrachloride for a period of over one hour. 150 ml. of additional carbon tetrachloride was added to the mixture during this period of time to permit stirring of the gum which formed immediately. On completion of the reaction, the mixture was decanted free of gum and the carbon tetrachloride filtrate was evaporated to dryness to give approximately 37 grams of a red oil. On standing, this material slowly crystallized to give dark crude N-(3-morpholinpropyl)anisamide melting at 85–95° C. This novel product was soluble in water and chloroform. A small portion, purified and titrated to bromphenol blue endpoint with 0.1 N hydrochloric acid, gave an equivalent weight of 277.6. The calculated value for this product is 278.3. The preparative reaction is shown below in Equation 15.

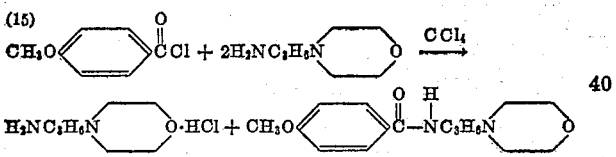

The identical product was made by mixing 0.3 mole each of anisic acid and the amine and holding the mixture at 190–195° C. until the theoretical amount of water (5.4 grams) had been lost.

*Example XXIII*

A 25 gram portion of the product of Example XXII dissolved in chloroform was treated with chloramine to give ammonium chloride precipitate. Evaporation of the filtrate gave the gummy crude 4-amino-4-[3-(anisoylamino)propyl]morpholinium chloride. Purification gave discolored crystals on being vacuum dried. These, on exposure to air, were rapidly converted to a resin the color and consistency of light amber. The novel hydrazinium salt softens to a pliochroic glass at about 75° C., but does not run clear below 200° C. It forms an oily hexafluorophosphate, a dull yellow picrate and a tan iodide, the second melting at about 181° C. and the third above 200° C.

*Example XXIV*

A 5 gram portion of 2-butoxy-N-(diethylaminoethyl)-cinchoninamide hydrochloride in 50 ml. of water and 50 ml. of chloroform was made alkaline with 10 ml. of 20% sodium hydroxide. The aqueous layer was reextracted with 50 ml. of chloroform and the combined organic layers were treated with chloramine gas stream until 1.2 equivalents of chloramine had been added to the reaction mixture. When the reaction was complete, the mixture was filtered and evaporated to dryness to give 1,1-diethyl-1-[2-(2-butoxycinchoninoylamino)ethyl] hydrazinium chloride. The novel product appeared as an off-white paste weighing 5.9 grams. Trituration with di-ethylether to dissolve the unreacted base gave 4.7 grams of an off-white product melting at about 93° C. It did not form a hexafluorophosphate, and the picrate appeared to be an oil. The product has been assigned the structure:

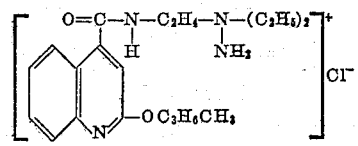

*Example XXV*

An 0.1 mole portion of aminoethylpiperidine in 80 ml. of chloroform was reacted with 0.11 mole of chloramine from the generator. A 76% yield (titration of chloroform-soluble chloride ion) of unisolated 1-amino-1-(2-aminoethyl)piperidinium chloride was obtained thereby. This material was evaporated dry in vacuo and taken up about 200 ml. of chloroform. It was filtered free of ammonium chloride then treated with stirring at 10–15° C. with 0.45 mole of 1-naphthoyl chloride in 50 ml. of chloroform over a period of one-half hour. The material was continuously stirred and allowed to come to room temperature and to remain there overnight. A precipitate was obtained therefrom containing a mixture of the hydrochloride of the aminoethyl-piperidinium chloride and some product. Evaporation of the solvent and extraction of the residual gum with carbon tetrachloride and benzene, followed by a recrystallization from ethyl acetate, gave the novel 1-amino-1-[2-(1-naphthoylamino)ethyl]piperidinium chloride, melting at about 178° C. The preparative reaction is shown below in Equation 16.

(16)

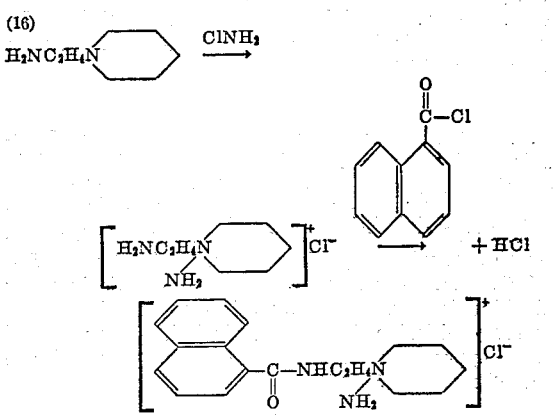

*Example XXVI*

An excess of solvent-free 3-diethylaminopropanol-1 was treated with a chloramine-ammonia gas stream at 25° C. From this mixture was obtained diethyl-(3-hydroxypropyl)hydrazinium chloride melting from 115–116° C.

*Example XXVII*

A 0.05 mole portion of the product of Example XXVI was added to a like quantity of nicotinoyl chloride hydrochloride in 250 ml. of pyridine and refluxed for 24 hours. The reaction mixture was poured into an equal volume of water containing 0.2 mole of sodium carbonate, stirred for 10 minutes and evaporated to dryness at 20–25° C. after adjusting the pH to 7.5 to 8 with HCl. This material was extracted with three 100 ml. portions of chloroform and evaporated to dryness to give the novel 1,1-diethyl-1-[3-(nicotinoyloxy)propyl]hydrazinium chloride; a hygroscopic gum.

*Example XXVIII*

A 25 gram portion of diethylaminoethyl p-aminosalicylate hydrochloride was converted to its free base in chloroform and reacted with chloramine from the generator to give 16 grams of a crude chloramine adduct as a precipitate. This material was dissolved in ten times its weight of methyl alcohol, filtered and poured into 100 ml. of diethylether. The resulting mix was filtered and recrystallized twice with Nuchar from ethanol to give off-white, hygroscopic, stubby, opaque needles which underwent a phase change at about 176° C. and melted with gas evolution at 195–196.5° C. The novel product was very soluble in water and methanol; it was decreasingly soluble in ethanol and dimethyl ketone. Its aqueous solutions, when treated with 1% ferric chloride solution, gave a relatively strong permanent wine color. When treated with the appropriate reagents, it gave a dull yellow picrate decomposing at about 121° C. and a hexafluophosphate which appeared to be soluble in excess reagent and precipitated only from concentrated aqueous solution. From the filtrate of the original chloroform reaction medium, additional 1,1 - diethyl - 1 - [2 - (4 - aminosalicyloyl)ethyl]hydrazinium chloride product and the corresponding betaine were obtained. The preparative reaction is shown below in Equation 17.

over a period of about 20 minutes. There was a marked heat evolution and rapid formation of a granular white precipitate. This was filtered off, washed well with water, then with 2% $NaHCO_3$, and again with water. The dried product, 1,1-dimethyl-1-(3-benzoylamino)propylhydrazinium benzoate, was recrystallized from water to give opaque crystals, melting at approximately 174° C. Its formation probably proceeds as shown in Equations 18–20.

(18)
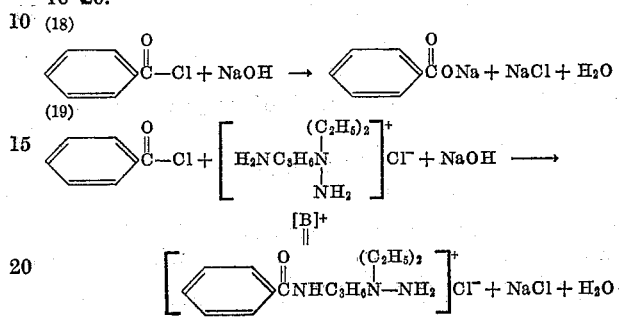

(17)
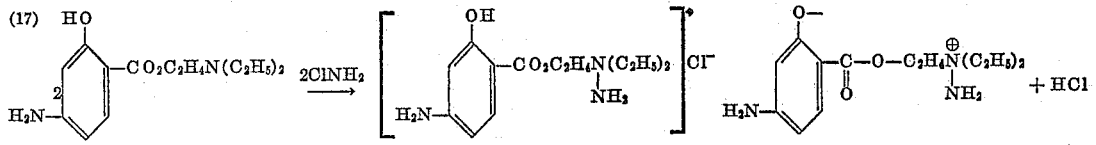

(20)
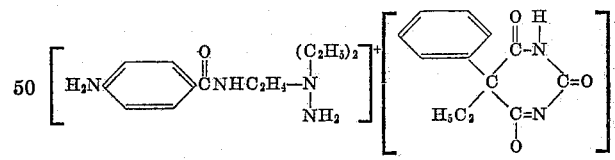

Example XXIX

A 100 mg. portion of (3-amino-4-n-propoxybenzoyloxy)ethyldiethylamine in 5 ml. of chloroform was treated with 5 ml. of chloroform containing an equivalent quantity of chloramine. The mixture was allowed to evaporate to dryness overnight. Extraction of the tan residue with cold isopropyl alcohol gave 58 mg. of 87% pure 1,1 - diethyl - 1 - [2 - (3 - amino - 4 - n - propoxybenzoyloxy)ethyl]hydrazinium chloride. This novel product appeared as a hygroscopic, off-white semi-solid, decomposing at about 153° C.

Example XXX

An approximately 1 molar aqueous solution of the product of Example XXIX was reacted with equivalent weights of (1) sodium stearate, (2) sodium oleate and (3) castile soap in the form of 5% aqueous dispersions. In each case soapy, waxy semi-solids were formed. They were soluble in ethanol and chloroform; recrystallizable from and dispersible in water. Each product showed a phase change at around 85° C. and ran clear at about 140° C.

Example XXXI

An anhydrous solution of sodium o-acetoxybenzoate was prepared by adding 0.01 mole of aspirin (sometimes called acetylsalicylic acid) to a solution of 0.01 mole sodium methoxide in 30 ml. dry isopropyl alcohol and shaking to effect complete solution. This was treated with an equivalent of the product of Example XVII in the same solvent. Warming briefly, then cooling, filtering and evaporating to dryness gave crude 1,1-dimethyl-1-(p-n-butylaminobenzoyloxy)ethylhydrazinium o-acetoxybenzoate. Recrystallization gave long needles which melted at about 122° C.

Example XXXII

An excess of solvent-free diethylaminopropylamine was treated in the usual manner with the chloramine-ammonia gas stream. The novel product resulting therefrom was diethyl-(3-aminopropyl)hydrazinium chloride.

Example XXXIII

A solution of 1 g. of the product of Example XXXII in 10 ml. $H_2O$ containing 1.0 g. NaOH was treated dropwise, with vigorous shaking, with 1.5 g. benzoyl chloride

Example XXXIV

To a solution of 50 mg. of sodium 5-ethyl-5-phenyl barbiturate in 20 ml. isopropyl alcohol was added a similar solution of the product from Example XVI. The mixture was refluxed for 30 minutes. It was then evaporated to approximately half its volume, cooled, and filtered free of sodium chloride. The white, pasty residue obtained on evaporation of the filtrate was recrystallized from a minimum of deionized water to give colorless crystals, melting at 201–203° C., of 1,1-diethyl-1-[2-(p-aminobenzoylamino)ethyl]hydrazinium 5 - ethyl -5- phenylbarbiturate, of the probable formula:

My novel compounds show remarkable properties which make them exceedingly effective as anti-oxidants in photographic developers, pharmaceuticals and pharmaceutical intermediates.

My novel hydrazinium compounds are, under certain conditions, unexpectedly effective anti-oxidants and reducing agents. While their dominant activity is dependent primarily upon the cationic structure, these particular physical properties vary somewhat with the nature of the anion. Thus the ascorbate, sorbates, and glutaconates and salts of unsaturated lower alkyl acids are marked reducing agents rather than anti-oxidants. The halides, for example, are primarily anti-oxidants rather than reductants. They are, for example, relatively stable to many common oxidants in an acidic atmosphere, but in the alkaline media they react with oxidizing agents. This inherent characteristic chemical property shows astonishing benefits in photographic process. Hydrazine is known to be useful in photographic development (see Mees, "Theory of the Photographic Process," pages 535–619, 1038–1039). The hydrazines would be far more useful in this work, however, if the effective, cheaper ones were more water soluble and less toxic (see Kirby, U.S. Patent No. 2,220,929 (1940). I have found that my novel products are excellent additives in the preparation of highly water soluble developers capable of controlled reduction of the silver halide on a photographic film.

My novel compounds are perhaps even more effective in their application as pharmaceuticals and their intermediates and for other medicinal purposes. The physiological activity and physical properties imparted to chemical compounds by the structure

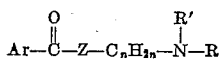

is well known. Thus compounds of the general formula

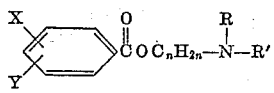

are well known local anesthetics, and include in their number such boons to mankind as the medicinally important compounds sold under the names Procaine, Larocaine, Oxycaine, Amydrocaine, Intracaine, Dibucaine, and many others. The amide analog of Procaine, available commercially as "Procainamide" and "Pronestyl," is most useful in treating arhythmias and other often fatal malfunctionings of the heart. All of these compounds are frequently used alone, e.g. as aqueous solutions of their hydrochloric acid salts. This is not without disadvantage; such salts, derived from strong acids and relatively weak to weak bases, will be acidic, frequently to the point of physiological irritation. They will also be readily neutralized by any base slightly stronger than the parent amine, thus forming the water-insoluble free base. These disadvantages are even more marked in compounding; one is limited in compounding useful water-soluble pharmaceutical mixtures from these salts to only such additives as will give an acidic environment to the final solution. Other useful salts of these bases, e.g. the medicinally important "Procaine Penicillin," where both the acid and the base are relatively weak, are even more susceptible to loss of desired activity by alkaline hydrolysis. My novel compounds, by comparison, offer advantages along these lines. Being salts of relatively strong bases (hydrazinium hydroxides approach the fixed alkalis in base strength), their solutions are much less acidic, and therefore less irritating and less readily hydrolyzed. For example, an aqueous solution of the product of Example XIX has a pH of 5.9, whereas the solution of the starting hydrochloride has a pH of 3.1. Above this marked advantage, and not completely related, is the advantage of marked stability of my novel salts to alkali and alkaline media. As shown in Example V, sodium bicarbonate alkalinity, i.e. water at pH 8, is sufficient to convert water soluble Procaine hydrochloride to sodium chloride and water-insoluble Procaine base. My novel hydrazinium chlorides, on the other hand, can be recovered unchanged from a medium of caustic soda alkalinity. This single major advantage is actually two fold, since (1) it means that my novel salts can be used as such in alkaline physiological fluids without precipitation and (2) my novel salts can be compounded into pharmaceutical formulations which are alkaline in nature without fear of precipitation caused by incompatability. The anti-oxidant action referred to earlier is also valuable pharmacologically. For example, the aforementioned valuable procaine penicillin salt is far more susceptible to loss of activity by oxidation than is the analogous novel salt of Example VIII.

Comparison of the physiological action of my novel hydrazinium compounds with the tertiary amines from which, by the Omietanski reaction, they might be derived, shows an additional advantage of value in therapeutics. Conversion of the base to the quaternized hydrazine engenders an additional desirable pharmacological property, a curare-like effect on the nervous system. This is, in many cases, combined with a marked increase in antispasmodic powers. Pharmaceutical utility does not imply complete equivalence between substituent groups. Even when the same psychological effect is produced by structually different hydrazinuim compounds, they are not usually equivalent because of marked differences in therapeutic dose range, tolerability range and extent of concomitant effects and ease of compounding and availability; to mention a few of the variable factors.

I claim:

1. Compounds according to claim 11 wherein Ar is benzene, X is amino, Y is H, Z is O, R is lower alkyl, and R is lower alkyl.

2. Compounds according to claim 11 wherein Ar is benzene, X is amino, Y is H, Z is NH, R is lower alkyl, and R' is lower alkyl.

3. Compounds according to claim 11 wherein Ar is quinoline, X is lower alkoxy, Y is H, Z is NH, R is lower alkyl, and R' is lower alkyl.

4. Compounds according to claim 11 wherein Ar is benzene, X is H, Y is H, Z is O, R is lower alkyl, and R' is lower alkyl.

5. Compounds according to claim 11 wherein Ar is benzene, X is lower alkyl amino, Y is H, Z is O, R is lower alkyl, and R' is lower alkyl.

6. As a new chemical compound, 1,1-diethyl-1-[2-(p-aminobenzoyloxy)ethyl] hydrazinium chloride.

7. As a new chemical compound, 1,1-diethyl-1-[2-(p-aminobenzoylamino)-ethyl]hydrazinium chloride.

8. As a new chemical compound, 1,1-diethyl-1-[2-(3-n-butoxycinchoninoylamino)ethyl]hydrazinium chloride.

9. As a new chemical compound, 1,1-dimethyl-1-(2-benzoyloxy-2-methylbutyl-1)hydrazinium chloride.

10. As a new chemical compound, 1,1-diethyl-1-[2-(p-n-butylaminobenzoyloxy)ethyl]hydrazinium penicillinate.

11. New chemical compounds of the general formula:

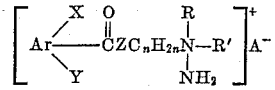

wherein Ar is a member selected from the group consisting of benzene, pyridine, naphthalene and quinoline; X and Y are substituents affixed to the same ring of said Ar and are selected from the group consisting of hydrogen, hydroxy, lower alkoxy, amino and lower alkyl amino; Z is selected from the group consisting of O and NH; R and R', taken individually, are lower alkyl radicals; R and R', taken collectively with the nitrogen on which they are both substituents, form a ring selected from the group consisting of morpholine, piperidine and pyrrolidine; $n$ is 2 to 6 inclusive; and A is a pharmacologically acceptable anion.

No references cited.

UNITED STATES PATENT OFFICE
CERTIFICATE OF CORRECTION

Patent No. 2,899,424                                                  August 11, 1959

Bernard Rudner

It is hereby certified that error appears in the printed specification of the above numbered patent requiring correction and that the said Letters Patent should read as corrected below.

Column 13, line 50, for "148% C." read -- 148° C. --; column 20, line 23, for "R" read -- R' --.

Signed and sealed this 16th day of February 1960.

(SEAL)
Attest:

KARL H. AXLINE                                           ROBERT C. WATSON
Attesting Officer                                     Commissioner of Patents